United States Patent [19]

Cadeo

[11] Patent Number: 5,564,305

[45] Date of Patent: Oct. 15, 1996

[54] APPARATUS AND METHOD FOR CONTROLLING THE RATE OF FLOW OF A LIQUID

[75] Inventor: Angelo Cadeo, Fichtenwag 24, CH-4852 Rothrist, Switzerland

[73] Assignees: Angelo Cadeo, Rothrist; Miteco AG, Zofingen, both of Switzerland

[21] Appl. No.: 423,392

[22] Filed: Apr. 17, 1995

[30] Foreign Application Priority Data

Apr. 18, 1994 [CH] Switzerland ............................. 1159/94

[51] Int. Cl.$^6$ ................................................ G01F 23/00
[52] U.S. Cl. ................................................ 73/304 R; 73/3
[58] Field of Search ................. 73/304 R, 3; 137/391; 417/36

[56] References Cited

U.S. PATENT DOCUMENTS

| | | | |
|---|---|---|---|
| 3,324,707 | 6/1967 | Charbonnier | 73/3 |
| 3,605,481 | 9/1971 | Basler | 73/3 |
| 3,885,587 | 5/1975 | Troope | 137/391 |
| 4,095,920 | 6/1978 | Needham et al. | 417/36 |
| 4,823,987 | 4/1989 | Switall | 137/391 |
| 4,897,797 | 1/1990 | Free, Jr. et al. | 364/500 |
| 4,908,783 | 3/1990 | Maier | 73/304 R |

FOREIGN PATENT DOCUMENTS

| | | |
|---|---|---|
| 2466003 | 3/1981 | France . |
| 865882 | 4/1961 | United Kingdom . |

*Primary Examiner*—Richard Chilcot
*Assistant Examiner*—Jewel V. Artis
*Attorney, Agent, or Firm*—Shenier & O'Connor

[57] ABSTRACT

A column of liquid is formed in a conduit for such liquid, of which flow-off amount gives then between two level measuring probes a constant value. This constant value is compared with the indicated value of a flow meter arranged in the conduit regarding the conformity in order to detect if the value indicated by the flow meter lies within a tolerance range or not. In the latter case, the error indication of the flow meter is too large and the liquid conduit is shut off. This controlling is made in arbitrary intervals automatically by the apparatus, whereby the interval is set by the speed with which the liquid column is completed.

2 Claims, 2 Drawing Sheets

Fig. 1
Fig. 2
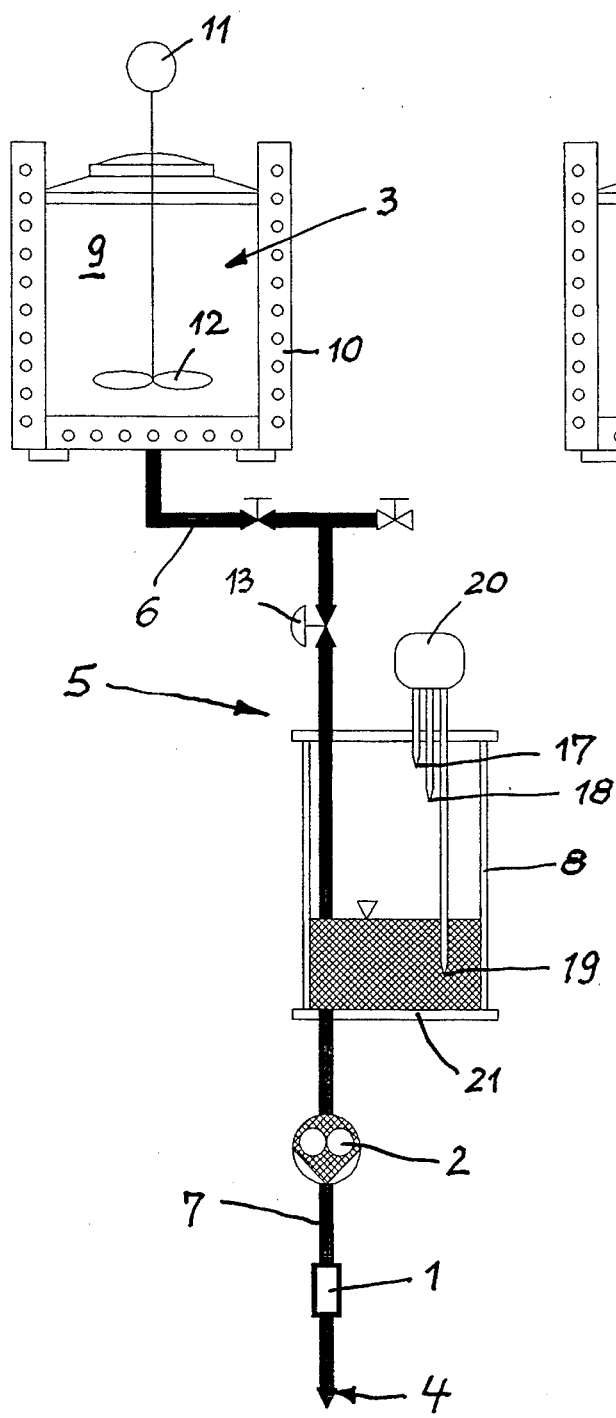
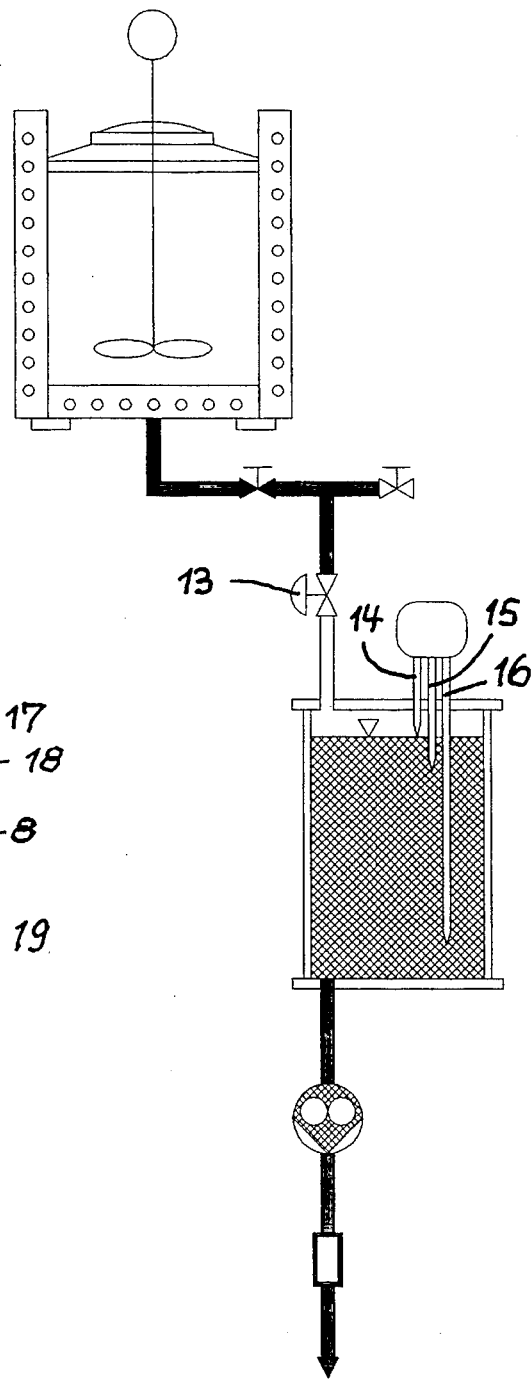

5,564,305

APPARATUS AND METHOD FOR CONTROLLING THE RATE OF FLOW OF A LIQUID

BACKGROUND OF THE INVENTION

1. Field of the Invention

The present invention relates to an apparatus for controlling a rate of flow of a liquid, having a conduit extending between a delivery site and a discharge site, and a flowmeter located in such conduit. The invention further relates to an application of the apparatus in a mixing plant which includes a plurality of such apparatuses.

2. Description of the Prior Art

In the field of controlling flow rates, may such be made by volumetric measuring apparatuses or also by rate flow measuring apparatuses, there always arises the problem regarding the reliability of the flow rate measuring apparatus, i.e. there always is the question of security regarding the value indicated by the flow rate meter and output therefrom for a further processing lying indeed within an allowable range of tolerance and being correct at all.

The apparatuses used until now solve this problem in part only because they are predominantly placed downstream of the flow rate controller and as a rule are not controlled or checked, respectively, by the respective process liquid but rather by water. Furthermore, the checking operation necessitates often an interruption of a production process and the flow rate meter is subjected only to a random controlling by an operator and usually only at the beginning of a production process.

SUMMARY OF THE INVENTION

It is a general object of the invention to provide an apparatus for controlling a rate of flow which does not incorporate the above drawbacks.

A further object is to provide an apparatus for controlling a rate of flow of a liquid which includes a buffer tank for the liquid, which buffer tank is located in the conduit extending between a delivery site and a discharge site, such that this conduit is divided into a first and a second conduit section, which first conduit section is located between the delivery site and the buffer tank, and which second conduit section is located between the buffer tank and the discharge site; having further a maximum-level switch having a level measuring probe including a detector point and operative to switch a flow of the liquid off, and having two further level measuring probes, each including a detector point, which detector points are arranged at a vertical distance from each other, which maximum-level switch and which measuring level probes are located in the buffer tank; which buffer tank includes a bottom and which detector points of the maximum-level switch of the measuring probes face the bottom of the buffer tank, and which detector point of the maximum-level probe is located higher than the detector points of the two further measuring probes; which first conduit section is adapted to let a larger flow rate pass through than the second conduit section, such to have the buffer tank filled with the liquid, whereby a constant value determined by the amount of liquid present between the two detector points of the two further level measuring probes is utilized for a comparison with the indication of the flow meter regarding their conformity.

BRIEF DESCRIPTION OF THE DRAWINGS

The invention will be better understood and objects other than those set forth above will become apparent when consideration is given to the following detailed description thereof. Such description makes reference to the annexed drawings, wherein:

FIG. 1 illustrates the inventive apparatus in the state of the setting-up of a liquid column in a buffer tank of the conduit;

FIG. 2 illustrates the apparatus after the completion of the setting-up of the liquid column and prior to the beginning of a measuring process of an amount of liquid present as a constant value;

DETAILED DESCRIPTION OF THE EMBODIMENT

Figure 3:
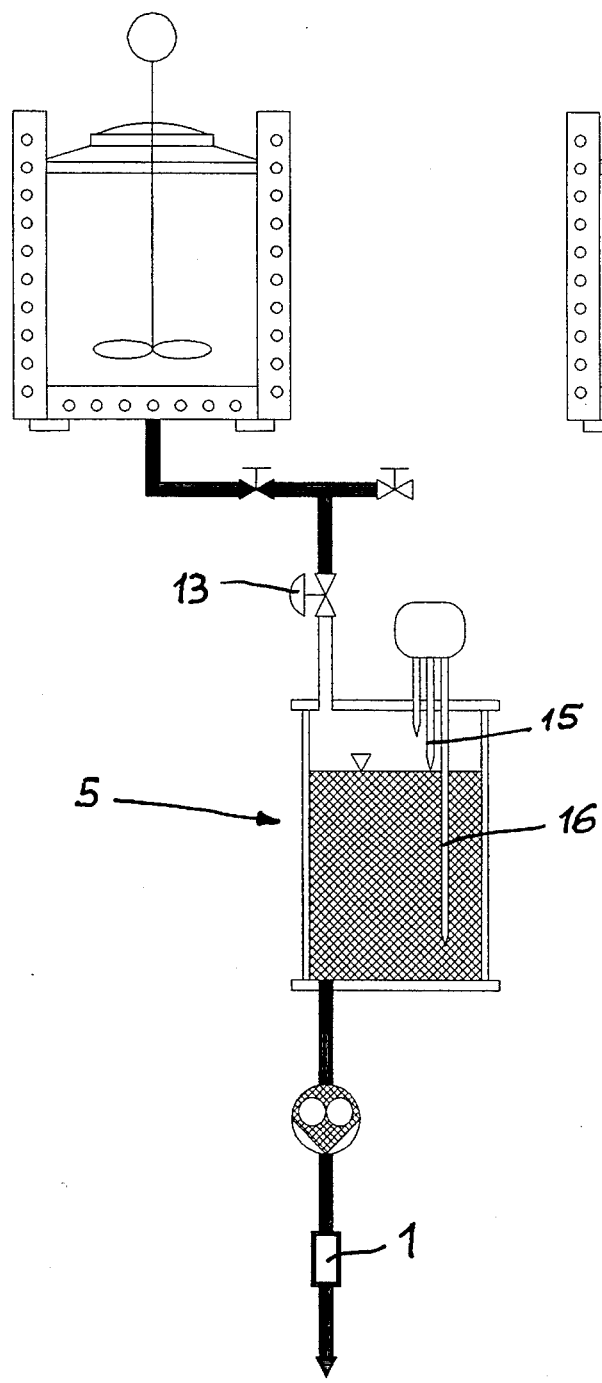
FIG. 3 illustrates the apparatus at the beginning of the measuring of the amount of liquid present as constant value within the buffer tank.

The apparatus includes a flow meter 1, a pump 2, a delivery site 3 and a discharge site 4. The apparatus includes, furthermore, a conduit 5 which is divided into a first conduit section 6 and a second conduit section 7. The first conduit section 6 extends between the delivery site 3 and a buffer tank 8, and the second conduit section 7 extends between the buffer tank 8 and the discharge site 4. Accordingly, the conduit 5 is divided into a first conduit section 6 and a second conduit section 7. The pump 2 supplies the liquid via the discharge site 4 for a further processing, whereby the rate of delivery of the Pump 2 may be constant or variable. The flow meter 1 is located downstream of the pump 2. The flow meter 1 measures the amount of liquid flowing therethrough and indicates this amount. This indication of the flow meter 1 shall be checked and therewith controlled by means of the inventive apparatus.

The delivery site 3 includes a liquid storage tank 9 which is supported in a frame 10. A motor 11 drives a stirrer 12 such to keep the liquid constantly agitated. The conduit 5 includes a plurality of shut-off valves, whereby for the understanding of the inventive apparatus only the shut-off valve 13 is of importance.

A maximum-level switch 14 operative to interrupt the flow of liquid and two level measuring probes 15 and 16 are located in the buffer tank 8. The maximum-level switch 14 has a detector point 17. The level measuring probe 15 has a detector point 18 and the level measuring probe 16 has a detector point 19. These detector points 17, 18, 19 respond to the respective level of the liquid column present in the buffer tank 8 and forward the level value e.g. by electrical signals to a processing apparatus 20. The detector points 17, 18 and 19 face the bottom 21 of the buffer tank 8. The detector point 17 of the maximum-level switch 14 is located at a higher level than the two detector points 18, 19 of the level measuring probes 15 and 16.

The first conduit section 6 is designed and adapted to let a larger flow rate flow therethrough than the second conduit section 7, such that accordingly in operation the buffer tank 8 is gradually filled due to the mentioned various flow rates through the two conduit sections 6 and 7. As already mentioned, the flow rate through the second conduit section 7 depends from the respective delivery rate of the pump 2. The flow rate through the first conduit section 6 can be determined e.g. by the weight of gravity of the liquid.

However, it could also be possible to have a not specifically illustrated pump located in the first conduit section 6. At any rate, however, it must be ensured that the flow rate in the first conduit section 6 is larger than the flow rate in the second conduit section 7, because otherwise the buffer tank 8 will be emptied and the entire apparatus would be shut off in such a case by not particularly illustrated apparatuses.

The vertical distance between the two detector points 18, 19 of the two level measuring probes 15, 16 determines the amount of liquid which is present as constant value and is used for monitoring and thus controlling the flow rate meter. Thus, the indication of the flow rate meter is compared with mentioned constant value regarding their conformity.

Figure 4:
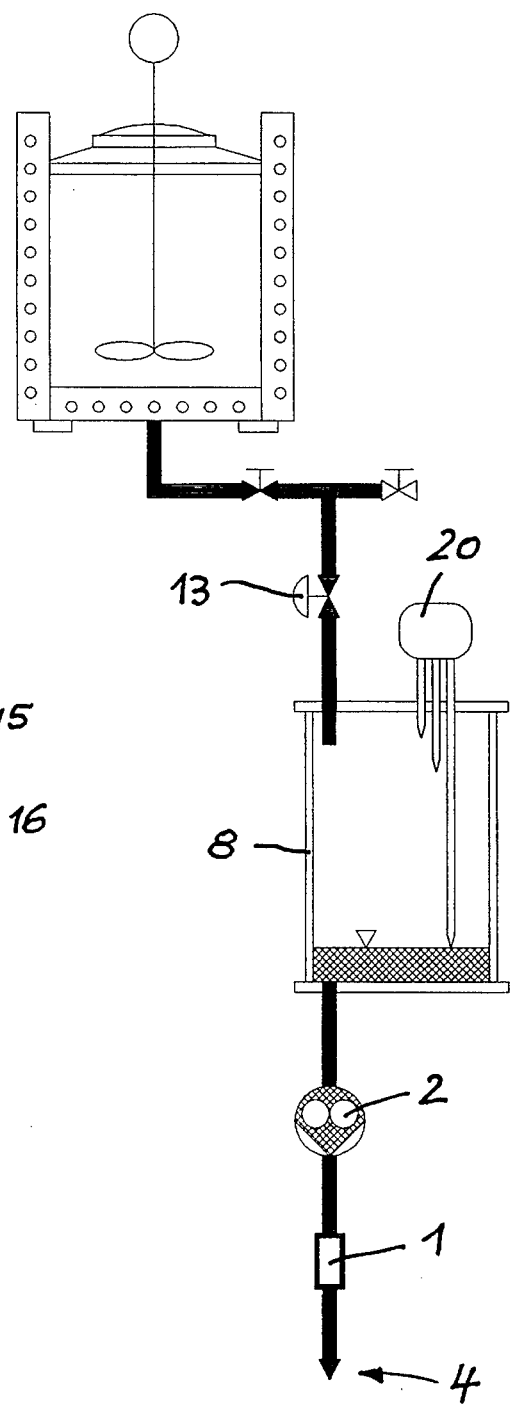
FIG. 4 illustrates the end of the measuring of the amount of liquid present as constant value in the buffer tank.

The operation with the inventive apparatus is as follows:

The rated value is set in the flow meter 1 (e.g. 100/L/h). The flow meter 1 measures the amount of liquid flowing therethrough itself as actual value (e.g. 99,8 L/h). As long as the difference between the rated value and the actual value lies within a set tolerance range, the apparatus illustrated in FIGS. 1 to 4 operates continuously in such a manner that a liquid is conveyed from the delivery site 3 to the discharge site 4. If the actual value lies outside of said set tolerance value, the apparatus, i.e. a plant connected to the apparatus is brought to a stop such that no longer liquid is fed from the delivery site 3 to the discharge site 4. An already known apparatus without the inventive design operates in the above described manner. Now, a problem occurs when the flow meter 1 indicates a wrong actual value. The feeding of a liquid keeps going (one is within mentioned tolerance rate) but actually an error occurs, namely a wrong flow rate. In order to avoid this error, the inventive apparatus includes the units 8 and 13–21. Because more liquid flows through the first conduit section 6 than through the second conduit section 7, a liquid column is continuously built up in the buffer tank 8 according to FIG. 1. The thickly drawn lines of the conduit 5 illustrate the flow of the liquid from the delivery site 3 to the discharge site 4. According to FIG. 1, the level of the liquid in the buffer tank 8 rises up to the position according to FIG. 2, where the level of the liquid has reached the detector point 17 of the maximum-level switch 14. Therefore, a signal is emitted via the unit 20 to the shut-off valve 13, which will thus be closed. Now, no liquid flows from the delivery site 3 to the buffer tank 8. The actual level of the liquid in the buffer tank 8 is hereby of no importance; it is also not important how fast the valve 13 will be closed. For the subsequent measuring procedure, the actual level in FIG. 2 is thus not decisive. Due to the shut valve 13, the level of the liquid decreases now in the buffer tank 8. As soon as the level of the liquid leaves the detector point 18 of the level measuring probe 15, thus being no more sensed by the probe, the measuring process begins which is illustrated in FIG. 3. This measuring process continues until the level of the liquid is no more detected by the detector point 19 of the level measuring probe 16. The end of the measuring process is illustrated in FIG. 4. The vertical distance between the two detector points 18 and 19 determine an amount of liquid in the buffer tank 8, which signifies a constant value. During this measuring process, thus between the positions according to FIGS. 3 and 4 the value indicated by the flow meter 1 is noted and will now be compared with the above mentioned constant value. It can now be seen which conformity is present between the indicated value of the flow meter 1 and the constant value. If the figure of this comparison lies within the above mentioned tolerance range, the flow meter operates correctly and the pump 2 continued feeds the liquid to the discharge site 4, whereby then the shut-off valve 13 is again opened by the unit 20 in accordance with FIG. 4, such that again a liquid column is established in the buffer tank 8.

The difference between the amounts flowing through the first conduit section 6 and the second conduit section 7 forms together with the volume of liquid in the buffer tank 8 present between the two detector points 18 and 19 the interval of the procedure, i.e. the monitoring or control program, respectively, for the flow meter 1. Thus, in the practical embodiment the volume of the liquid in the buffer tank 8 between the two detector points 18 and 19 is not selected too large in case of a small amount of liquid flowing in the first conduit section 6 such that a monitoring or controlling program, respectively, for the flow meter can be run often enough (e.g. 3- or 30-times per hour).

The inventive apparatus can find application in a mixing plant, in which a plurality of such apparatuses are present operating parallel to each other, whereby the apparatuses are intended to cope with different liquids. The above mentioned program for the flow meter 1 can then be applied for each of the above mentioned apparatuses for different components of a mixture and, furthermore, this program can proceed at the various components of the mixture also with different intervals.

While there are shown and described present preferred embodiments of the invention, it is to be distinctly understood that the invention is not limited thereto but may be otherwise variously embodied and practiced within the scope of the following claims.

I claim:

1. An apparatus for controlling a rate of flow of a liquid, having a conduit extending between a delivery site and a discharge site, and a flowmeter located in said conduit, comprising a buffer tank for said liquid, which buffer tank is located in said conduit such that said conduit is divided into a first and a second conduit section, which first conduit section is located between the delivery site and the buffer tank and which second conduit section is located between the buffer tank and the discharge site; comprising further a maximum-level switch having a level measuring probe including a detector point and operative to switch a flow of the liquid off, and comprising two further level measuring probes each including a detector point, which detector points are arranged at a vertical distance from each other, which maximum-level switch and which level measuring probes are located in said buffer tank; which buffer tank includes a bottom and which detector point of said maximum-level switch and of said measuring probes face the bottom of said buffer tank and which detector point of said maximum-level probe is located higher than said detector point of said two further measuring probes; which first conduit section is adapted to let a larger flow rate pass through than said second conduit section such to have said buffer tank filled by the liquid; whereby a constant value determined by the amount of liquid present between the two detector points of said two further level measuring probes is utilized for a comparison with the indication of said flow meter regarding their conformity.

2. A method for controlling the rates of flow of two liquids including the steps of measuring the rate of flow of a first liquid, determining if the error between such measured rate and a first desired rate of flow is within predetermined limits, measuring the rate of flow of a second liquid, determining if the error between such measured rate and a second desired rate of flow is within predetermined limits, and interrupting the flows of both liquids if the error in rate of flow of either liquid is outside its predetermined limits, the rate of flow measuring step for each liquid including the steps of introducing the liquid into a tank at a rate appreciably greater than the desired rate until a first liquid level is reached and the tank holds a first volume of liquid, interrupting the flow of liquid into the tank, permitting flow from the tank at the rate to be measured until a second and lower liquid level is reached and the tank holds a second and reduced volume of liquid, permitting flow from the tank to continue at the rate to be measured until a third and still lower liquid level is reached and the tank holds a third and further reduced volume of liquid, and determining the measured rate of flow from the difference between the second and third volumes and the time required for the liquid in the tank to drop from the second level to the third level.

* * * * *